(12) United States Patent
Noble et al.

(10) Patent No.: US 6,173,966 B1
(45) Date of Patent: *Jan. 16, 2001

(54) T-JOINT GASKET ASSEMBLY

(75) Inventors: Lane Noble, Novi, MI (US); Thomas Boardman, Gilford; Daivd Paul Kraus, Manchester, both of NH (US)

(73) Assignee: Freudenberg-NOK General Partnership, Plymouth, MI (US)

( * ) Notice: Under 35 U.S.C. 154(b), the term of this patent shall be extended for 0 days.

This patent is subject to a terminal disclaimer.

(21) Appl. No.: 09/268,335

(22) Filed: Mar. 16, 1999

Related U.S. Application Data

(63) Continuation-in-part of application No. 08/944,447, filed on Oct. 6, 1997.

(51) Int. Cl.⁷ .................................................... F16J 15/12
(52) U.S. Cl. ........................ 277/596; 277/591; 277/598; 277/594
(58) Field of Search .................... 277/594, 591, 277/596, 598

(56) References Cited

U.S. PATENT DOCUMENTS

| | | | |
|---|---|---|---|
| 5,222,745 | * | 6/1993 | Akbar et al. ........................ 277/596 |
| 5,618,047 | * | 4/1997 | Betler .................................. 277/596 |
| 5,662,337 | * | 9/1997 | Surbrook et al. .................... 277/596 |
| 6,003,878 | * | 12/1999 | Noble et al. ......................... 277/596 |

* cited by examiner

Primary Examiner—Anthony Knight
Assistant Examiner—Enoch E Peavey
(74) Attorney, Agent, or Firm—Dinnin & Dunn, PC

(57) ABSTRACT

A T-joint gasket assembly for sealing a first surface, a second surface adjacent to the first surface and a third surface intersecting the first and second surfaces, said first, second and third surfaces generally forming a T-joint, said T-joint being sealed absent an external sealant such as an RTV sealant agent, said gasket assembly comprising: a first gasket member which has at the ends thereof a plurality of sealing beads and at least one sealing finger, a second gasket member positioned generally coextensive with said third surface, and being oriented so as to provide a T-joint like connection with said first gasket member, with both the first gasket member and the second gasket member including a supportable elastomeric sealing material to carry out the gasket sealing, said second gasket member possessing a plurality of elastomeric sealing pads thereon, said sealing beads and said sealing finger of the first gasket member being provided to make sealing contact with said sealing pads on said second gasket member to form a sealed T-joint.

35 Claims, 8 Drawing Sheets

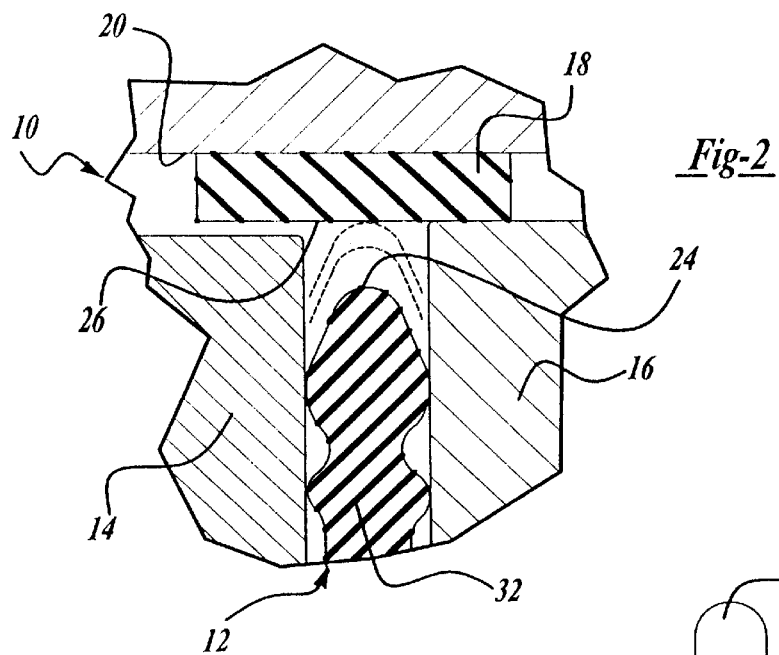
_Fig-2_
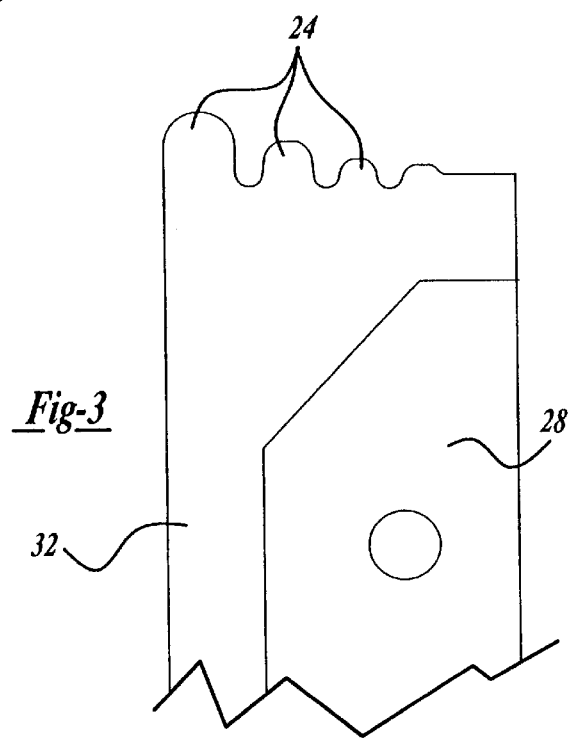
_Fig-3_
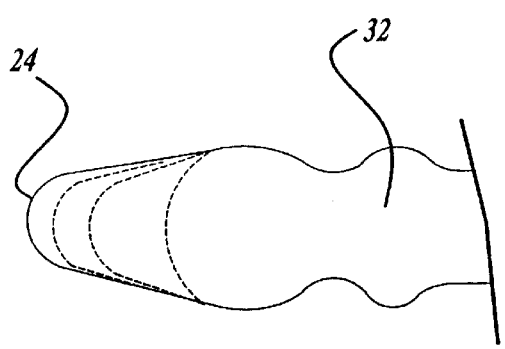
_Fig-4_
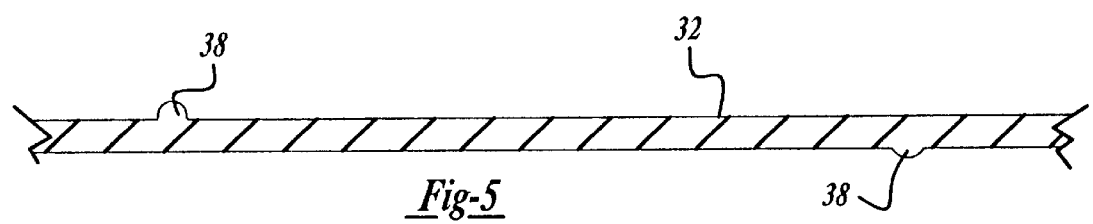
_Fig-5_

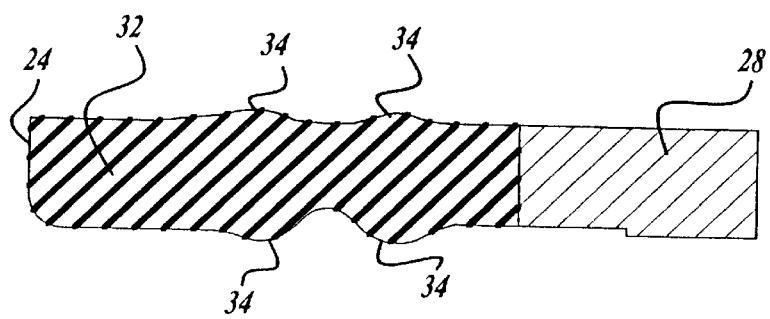
_Fig-6_
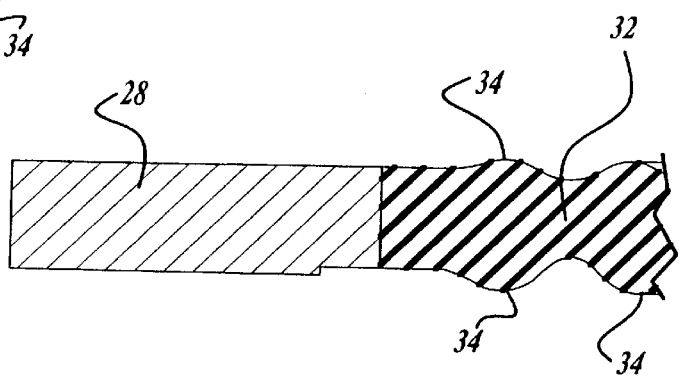
_Fig-7_
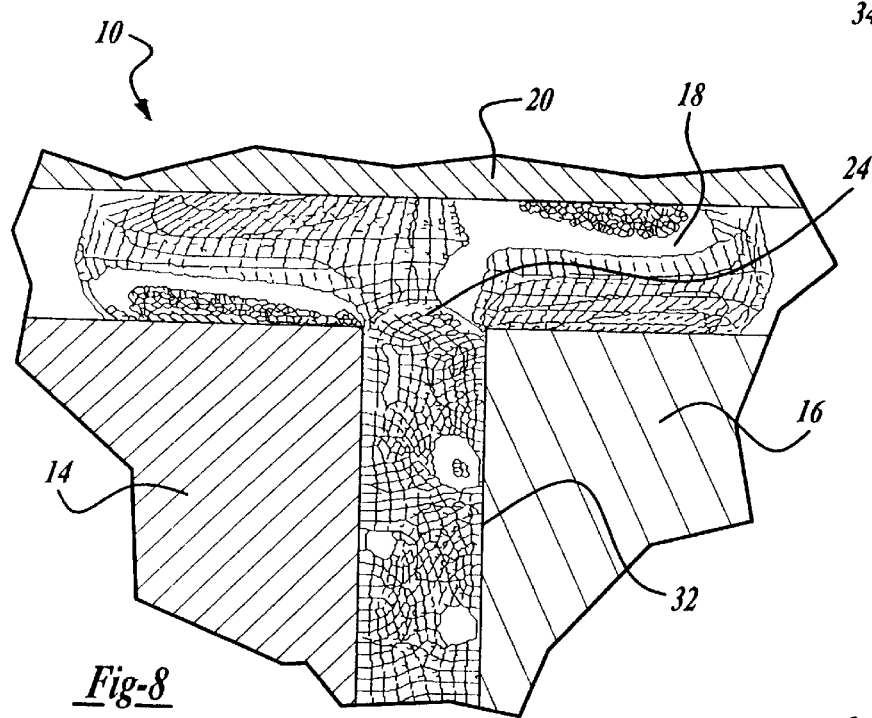
_Fig-8_
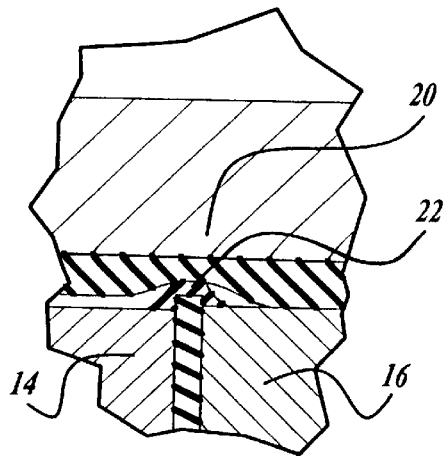
_Fig-9_
_Prior Art_

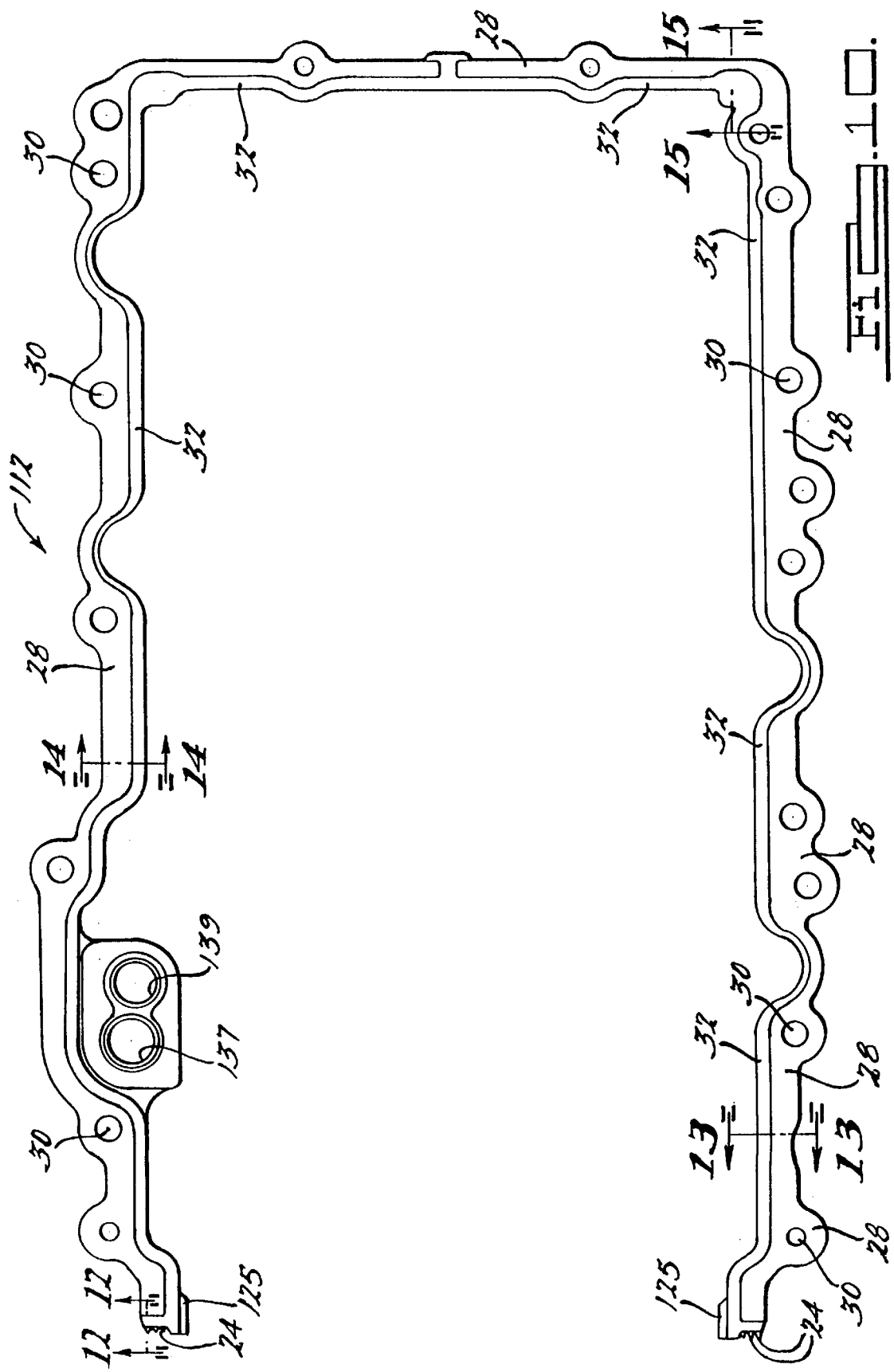

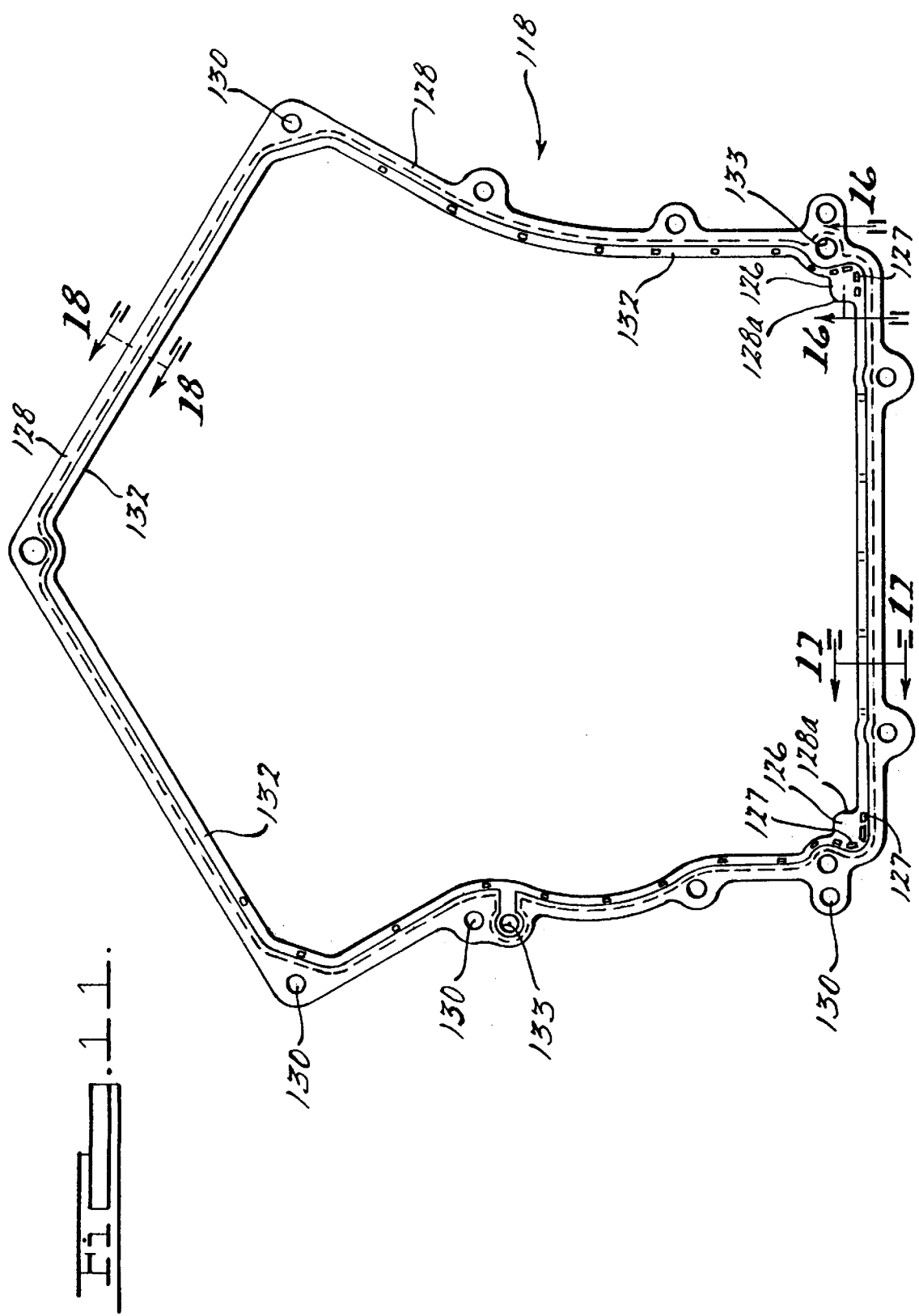

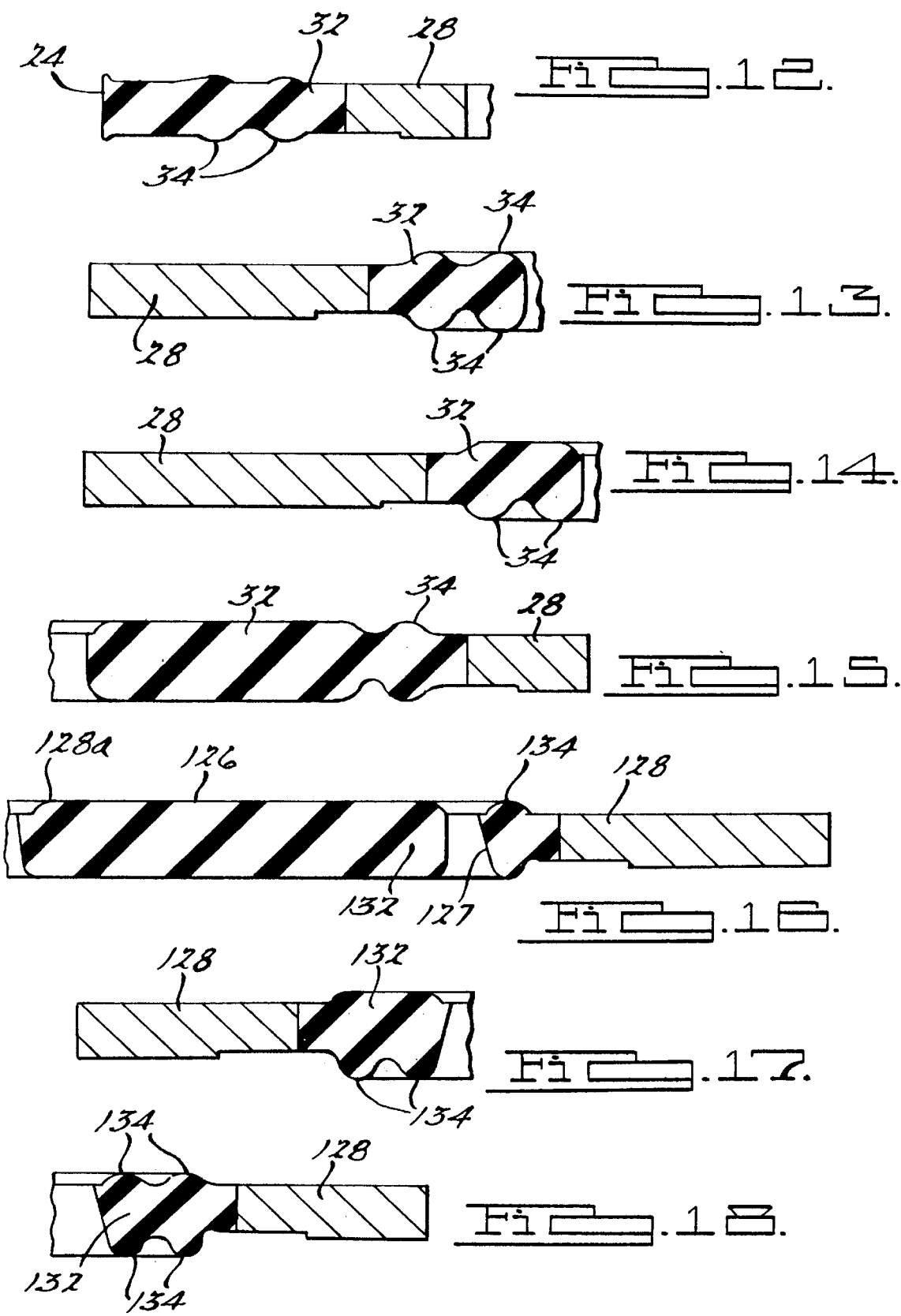

T-JOINT GASKET ASSEMBLY

This application is a continuation-in-part of application Ser. No. 08/944,447, filed Oct. 6, 1997.

BACKGROUND OF THE INVENTION

1. Field of the Invention

The present invention relates to gaskets and gasket sealing mechanisms, and in particular, to an improved T-joint gasket assembly which does not require or use RTV sealant (i.e., Room Temperature Vulcanizing sealant or agent).

2. Description of Related Art

Gaskets are used to provide a leak proof seal between two engine parts or other devices. Typically, the parts being sealed include flat sealing surfaces which are adjacent to one another during use. The gasket is typically placed between the opposite surfaces of the two components and compressed between them to prevent the escape of a gas, fluid or other medium. Many different variations and structures have been used in the prior art for gaskets and their sealing arrangements.

A particular problem has arisen in prior art seals which are used at a T-joint. A T-joint occurs at the intersection of three sealing surfaces. Such a T-joint may be found between a front cover, an oil pan and an engine block in an automotive engine. Many of the prior art attempts at providing a seal for such a T-joint have either used a sealant, or caulking medium such as a RTV sealant, or have used key and hole arrangements having flat surfaces in an attempt to provide a leak proof seal environment.

The prior art attempts at sealing a T-joint have not been successful in terms of costs and problems with application. First, the sealing or caulking medium that is used such as RTV sealant is very costly, messy and difficult to service. RTV sealant has also been known to effect the seal environment by over filling the adjacent trench in which the gasket sits, thus providing a gap where fluid and/or gas may leak around the seal. Another problem is that the RTV sealant used in such seals hardens over time, and cracks, thus creating a leak around the sealing element.

The other type of seal arrangement is the key and hole which has flat surfaces that are prone to failure because of the relatively small amount of shift allowed in the mating components. This results in less than desirable interlocking and insufficient sealing between the T-joint elements.

Therefore, there has been a long need in the art for a T-joint seal that is easy to install, relatively inexpensive, and adapted to last much longer than the RTV sealant based seals.

SUMMARY OF THE INVENTION

One object of the present invention is to provide a new and unique T-joint gasket assembly, e.g., that does not require RTV sealant.

Another object of the invention is to provide a unique T-joint gasket assembly that includes a plurality of special sealing beads at the end of generally U-shaped horizontal gasket member, which sealing beads are specially adapted for sealing engagement with a vertically oriented gasket member.

Another object of the present invention is to provide a seal assembly that limits the need for a secondary sealant at multiple joint interfaces.

Yet a further object of the present invention is to provide a seal element that eliminates the need for an engine assembly line purge due to the hardening effect of RTV sealants.

A further object of the invention is to provide a seal assembly that enables reusability of gaskets in service.

Yet another object of the present invention is to provide a seal assembly that reduces the cost and improves the cleanliness of the engine assembly process.

One advantage of the present invention is that it will eliminate the need for secondary sealant in multiple joint interfaces.

Yet a further advantage of the present invention is that it enables the reusability of gaskets while in service.

There are also servicing difficulties with RTV type gaskets. This is because the RTV sealant adheres to the gaskets and causes tearing when disassembled for service work. This invention enables disassembly and assembly without damage of the gaskets, and does not require RTV in service applications.

A further advantage of the present invention is that it reduces costs and improves the cleanliness of the engine assembly process.

Other objects, features and advantages of the present invention will become apparent from the subsequent description and appended claims, taken in conjunction with the accompanying drawings.

BRIEF DESCRIPTION OF THE DRAWINGS

FIG. 2 shows a cross section of a T-joint interface of the present invention;

FIG. 3 shows the sealing beads at the end of the gasket member;

FIG. 4 shows a side view of the sealing beads;

FIG. 5 shows a cross section of the gasket member along the line 5—5 in FIG. 1;

FIG. 6 shows a cross section of the gasket along the line 6—6 in FIG. 1;

FIG. 7 shows a cross section of the gasket along the line 7—7 in FIG. 1; and

FIG. 8 shows the T-joint seal after compression.

FIG. 9 shows a prior art RTV seal joint.

FIGS. 10 AND 11 illustrate another embodiment of a T-joint gasket in accordance with the invention;

FIG. 12 is a cross-section view taken along the line 12—12 in FIG. 10;

FIG. 13 is a cross-section view taken along the line 13—13 in FIG. 10;

FIG. 14 is a cross-section view taken along the line 14—14 in FIG. 10;

FIG. 15 is a cross-section view taken along the line 15—15 in FIG. 10;

FIG. 16 is a cross-section view taken along the line 16—16 in FIG. 11;

FIG. 17 is a cross-section view taken along the line 17—17 in FIG. 11; and

FIG. 18 is a cross-section view taken along the line 18—18 in FIG. 11.

Like numerals in different drawing figures indicate like elements.

DESCRIPTION OF PREFERRED EMBODIMENTS OF THE INVENTION AND BEST MODE

Figure 1:
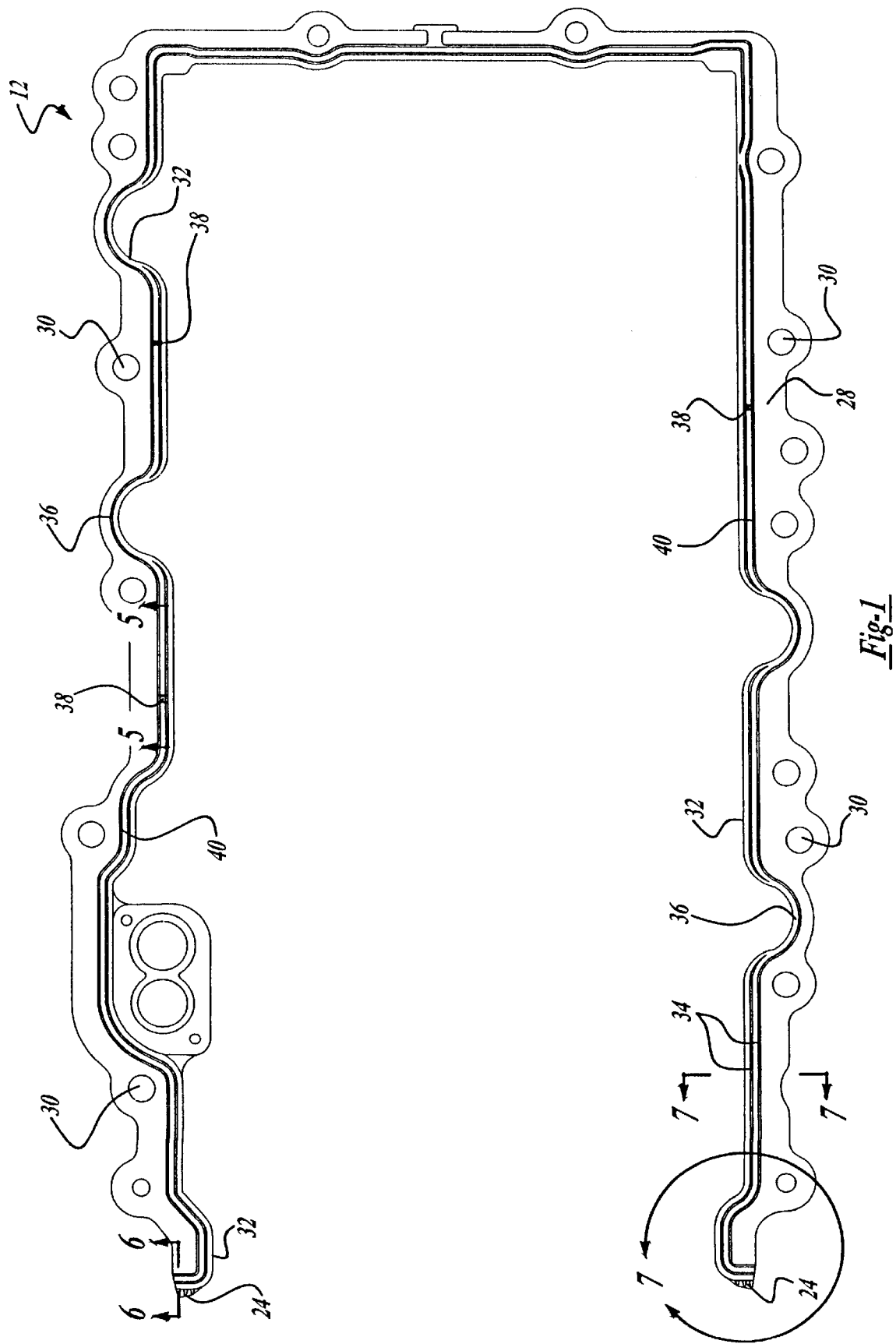
FIG. 1 shows a plan view of one embodiment of the present invention.

Referring to one preferred embodiment in FIGS. 1–8 of the drawings, a gasket assembly 10 for use in a T-joint or multiple joint sealing interface is shown. The gasket assembly 10 (see FIGS. 1 and 2) includes a first gasket 12 which generally has a U-shaped design. However, it should be noted that other shapes can be used depending on the need and the multiple joint interface to be sealed. The first gasket 12 is used to seal between a first 14 and second sealing surface 16. The first 14 and second sealing surface 16 can be the oil pan and engine block, but may be other components found in an automotive engine (or other machines or products). The first gasket 12 interacts and mates with a second gasket 18 to form a gasket assembly 10. The second gasket 18 is placed between a third sealing surface 20 such as a front cover and the above mentioned engine block and oil pan. A three surface interface such as described above, that requires sealing, have also been known as T-joints. A proper T-joint seal in the T-joint will prevent leakage of a liquid or gas through the three surface interface.

The gasket assembly of the present invention does not require an RTV sealant. Prior art seals have used an RTV sealant 22 to provide a seal at the multiple joint interface, as shown in FIG. 9. But the prior art seal experienced numerous problems in that the RTV sealant 22, if not applied precisely, would interfere with the function of the gasket. Additionally, if the RTV was left applied to the T-joint during an assembly line shutdown, then the hardening of the RTV would cause non-performance of its function, and it would tend to harden and become brittle over time in the automotive engine environment. This hardening and brittleness of the RTV causes uneven sealing surfaces, thus creating a subsequent leaking environment within the T-joint seal.

The present invention involves an RTV-less gasket with special sealing beads 24 which interact and mate (e.g. FIG. 2) with a sealing pad 26 from the second gasket 18 to create a leak free seal at the T-joint interface. It should be noted the sealing pad 26 is preferably made of an elastomer material, but any other type of resilient material such as rubber, soft plastic, or other soft resilient seal material may be used. The first gasket 12, shown in more detail in FIG. 1, includes a core member 28 having a plurality of orifices 30 for use in aligning and securing the first gasket 12 between the first 14 and second sealing surfaces 16 (e.g. for attachment of the oil pan to the lower surface of the engine block). In one preferred embodiment the core member 28 is made of a metal material, but it should be noted that any type of hard ceramic, plastic, or any other type of hard relatively rigid material may be used to form the core of the U-shaped gasket member 12.

The sealing member 32 generally has a U-shaped design along the plane of sealing and is connected to the inside surface of the core member 28. The sealing member 32 is preferably made of an elastomeric material and may be any type of resilient rubber, ceramic or plastic capable of performing the sealing function. The sealing member 32 typically includes a dual sealing ridges or ribs 34 (see FIG. 1 or 7) around its entire periphery. The sealing ridge 34 at times converges into a single sealing ridge 36, but still provides for at least one sealing ridge around the entire upper and lower surface of the gasket member 12. The sealing ridge 34 is used to create the seal between the first and second surfaces 14, 16 such as the engine block and oil pan. Located between the pair of sealing ridges 34 on the top and bottom surfaces of the sealing member 32 are spacer, dam, or separator member(s) 38 (e.g. FIG. 5) which insure that the sealing ridges maintain a degree of separation from each other thus creating a better sealing surface and seal between the first and second sealing surfaces 14,16. A plurality of the separator members 38 occur at regular intervals between the sealing ridges 34 on the sealing member 32. The sealing member 32 is preferably directly molded on the core members inner surface 40 (FIG. 1), but it should be noted other methods such as direct bonding or any other type of securing method can be used. The sealing ridges 34 found on the sealing members top and bottom surfaces extend beyond the flat side surfaces of the core member 28, insuring that the sealing member 32 provides the necessary seal and that the core member 28 provides stability and proper alignment of the gasket between the sealing surfaces (14, 16).

A plurality of special sealing beads 24 (see FIGS. 1, 2, 3) extend from each end of the seal member 32. The sealing ridges 34 gradually end at the sealing beads 24. In a preferred embodiment, three sealing beads 24 extend outwardly from the seal member 32 (FIG. 3). Each of the sealing beads 24 extend a predetermined distance longitudinally from the sealing member 32. The height or distance can range from 5 millimeters down to 0.25 millimeters, but in the preferred embodiment the height ranges from 3 millimeters to 1 millimeter. After the first gasket member 12 is installed between the first and second sealing surfaces (14, 16) and as the sealing member 32 sealingly engages the first and second sealing surfaces (14, 16), the dual ridges 34 flow or deform to the thickness of the core member 28. Because the elastomer is incompressible (i.e., it can be displaced or deformed, but it is not compressible); the sealing beads 24 extrude toward the second gasket on the third surface 20 of the second sealing joint. At least one of the plurality of sealing beads 24 extends or extrudes from the sealing member 32 in order to sealingly engage the seal pad 26 of the second gasket 18 as shown in FIGS. 2 and 8.

A second gasket 18 is used in the gasket assembly 10 and is placed between a third sealing surface 20 and the combined first and second sealing surface (14, 16) which meet at a T-joint or multi-joint interface (see FIG. 2). The third sealing surface 20 usually is found on a front cover of an automotive engine. At least one of the sealing beads 24 protrudes from the first sealing joint and interengages with a sealing pad 26 of the second gasket 18 which is found between the third sealing surface and the combined first and second sealing joint. The resilient sealing beads 24 will create a leak free seal with the sealing pad 26 of the second gasket 18 thus providing an RTV-less T-joint seal. If all three of the sealing beads 24 protrude from the first sealing joint then all three will interengage and create a leak free seal with the seal pad 26 of the second gasket 18. It should be noted that only one sealing bead 24 needs to interact and interengage with the sealing pad 26 of the second gasket 18 to create a leak free T-joint seal. It should also be noted that the preferred embodiment uses three sealing beads 24, but a different plurality of sealing beads 24 (e.g., from 2 to 10) may be used depending on the operating environment of the automotive engine or apparatus being sealed. The sealing beads heights vary from one and another, but are at least equal to the total tolerances allowed for between the third sealing surface and the first joint surface.

In the FIGS. 1–3 embodiment the first sealing joint provides a near flush condition for the second sealing joint at the intersection of the T-joint. The near flush condition provides a single plane for the T-joint seal without the use of liquid sealants. Thus the first sealing joint in the embodiment creates a flat surface with only the sealing beads 24 extending or creating any uneven surface along the first sealing joint. This prevents and eliminates the use of any RTV sealant and thus further reduces the cost of manufacturing and replacing seals that are used in T-joint sealing interfaces.

Another particularly advantageous embodiment of the invention is the T-joint gasket assembly shown in FIGS. 10–11, which is described hereinafter. Like numerals indicate similar elements described in earlier drawing figures.

Figure 19:
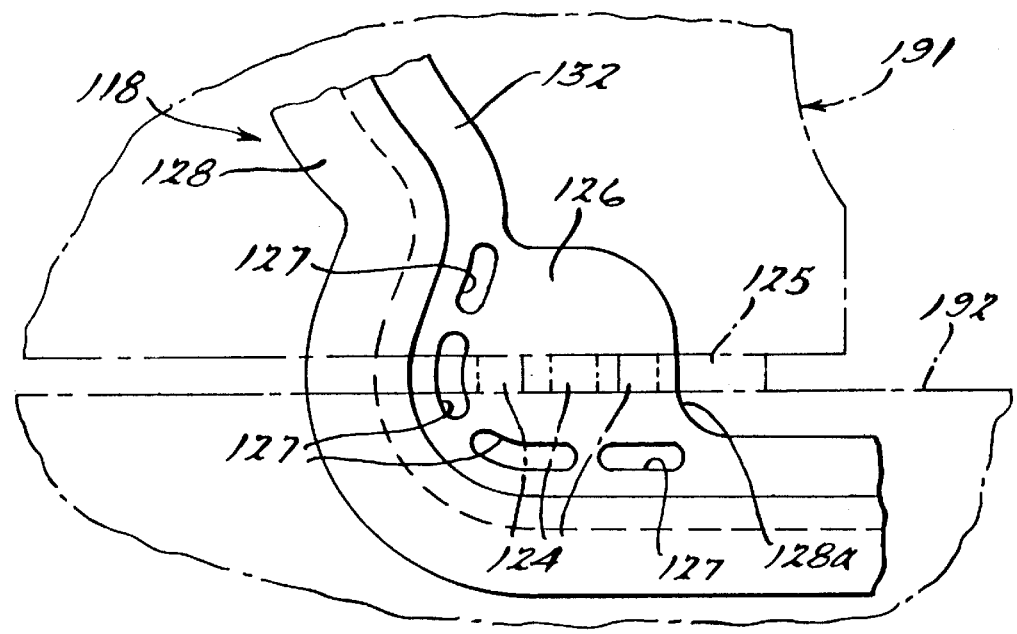
FIG. 19 is a partially cut-away plan view illustrating T-joint sealing using the gasket members of FIGS. 10–11, as seen through the timing chain cover.
Figure 20:
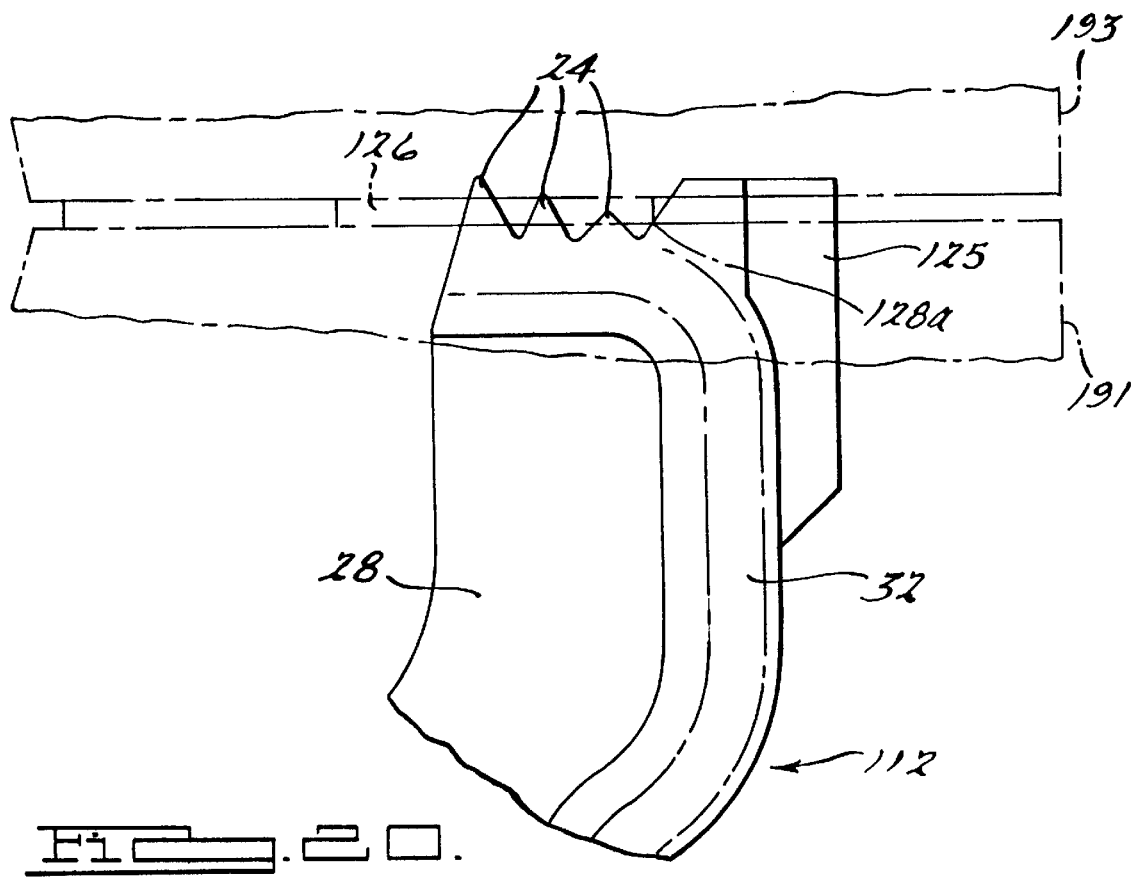
FIG. 20 is a partially cut-away plan view illustrating the T-joint sealing using the gasket members of FIGS. 10–11, as seen viewing down through the engine block.
Figure 21:
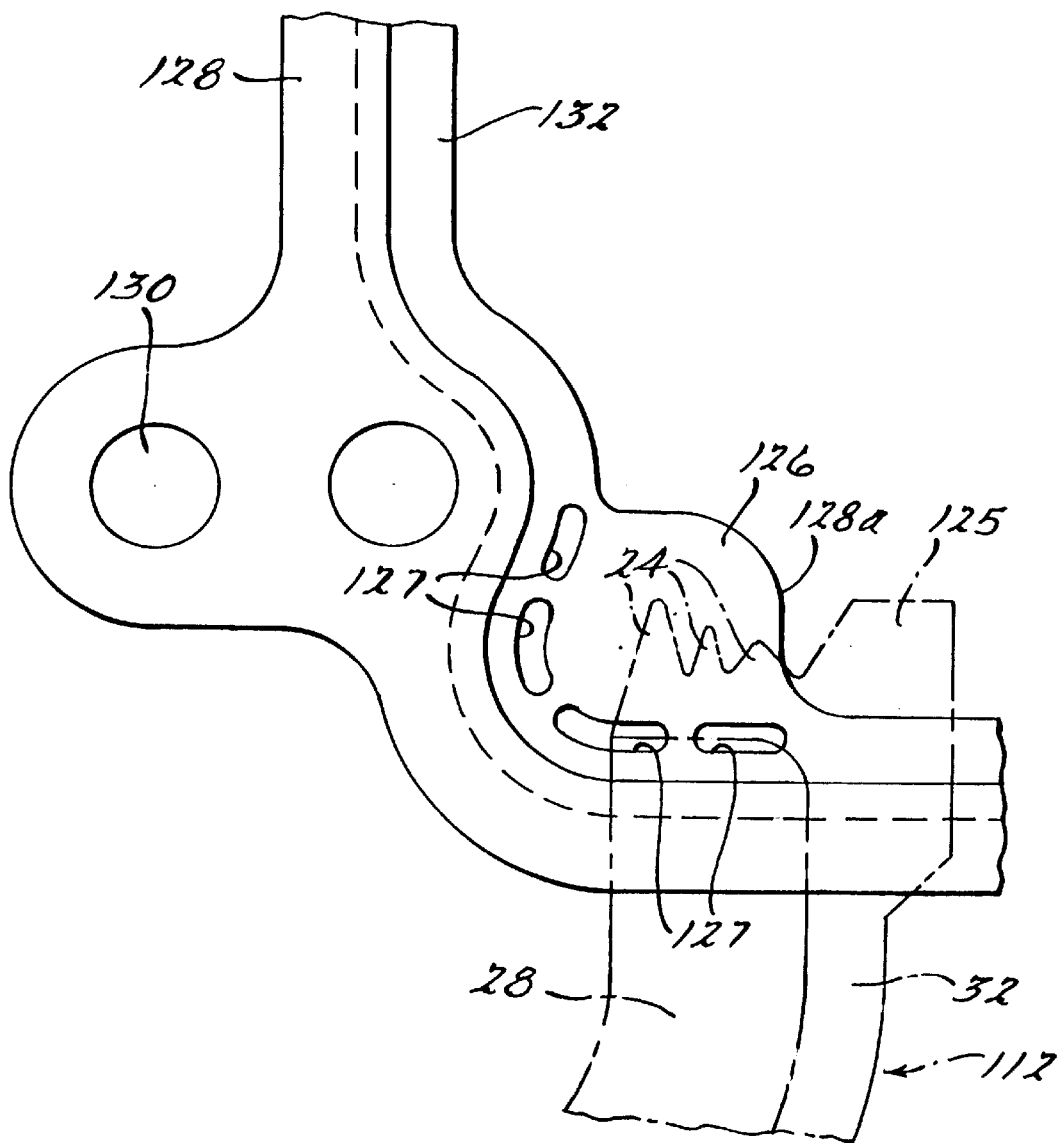
FIG. 21 is a partially cut-away plan view also illustrating the T-joint sealing using the gasket members of FIGS. 10–11, but being in a more exploded view format to show how the sealing beads of the oil pan gasket make sealing contact with a sealing surface of the front cover gasket.

FIGS. 12–18 show various cross-sectional views taken off of FIG. 10 or 11. FIGS. 19, 20 and 21 show different exploded plan views to illustrate how the T-joint gasket assembly of FIGS. 10–11 are sealingly engaged to carry out the T-joint sealing function.

In FIG. 10 the gasket member is designated 112 and is of generally U-shaped configuration. The gasket 112 includes a relatively rigid core member 28, (similar to that used in the gasket of FIG. 1) and also includes a plurality of orifices 30 for use in aligning and securing the gasket 112 to the bottom of an engine block. An elastomeric sealing member 32 is attached to the core member 28 with the sealing member 32 having a cross-sectional configuration as shown in FIGS. 12, 13, 14, and 15.

FIG. 11 illustrates a second gasket member 118 which is sealingly engage with the gasket member 112 of FIG. 10 to form the T-joint sealing connection. The gasket member 118 is typically positioned between the front of the engine block and the timing chain cover, whereas the gasket 112 is positioned on the bottom of the engine block for sealing engagement between the oil pan and lower part of the engine block.

At each end of the U-shaped gasket member 112 there are a plurality of special sealing beads designated 24 (similar to the same type of sealing beads shown in the FIG. 1). A further advantage is present in the gasket member 112, in that there are also located a special large sealing finger member 125 closely adjacent to the sealing ribs 24 at each end of the U-shaped gasket 112. These sealing fingers 125 and their associate sealing ribs 24 are specially constructed to sealingly mate with the two sealing pads 126 shown on the lower part of the gasket member 118.

The gasket member 118 is typically constructed using a relatively rigid core member 128 which supports an elastomeric seal material 132 which runs around the entire inner periphery of the gasket member 118, with the seal material 132 having dual sealing ridges designated 134 as shown in FIGS. 17–18.

FIG. 16 illustrates a sectional view along the line 16—16 in FIG. 11 to illustrate another view showing the sealing pad surface designated 126, a raised sealing rib 134 and a plurality of small holes or apertures 127 (see also FIG. 11) which are formed through the sealing material 132.

In the oil pan gasket member 112 there are a plurality of small holes designated 30 in the metal core member 28. This plurality of holes 30 are for location purposes when the gasket member 112 is installed on the engine block. And for example, in an automotive assembly line the oil pan gasket member 112 typically is installed while the engine block is an upside down position. There are generally threaded studs (not shown) on the bottom of the engine block for which these plurality of holes 30 are placed on for properly locating the gasket member 112 and for the subsequent application of nut-type fasteners onto the threaded studs which protrude from the bottom of the engine block, thereby to secure the gasket 112 thereon. Generally, a combination of threaded studs and fastener bolts are used.

In FIG. 10 there are also illustrated two rubber-lined holes or apertures designated 137, 139. These two rubber-lined apertures 137, 139 are typically used as sealed throughput locations for high pressure conduits or ports (not shown) which permit oil to be pumped up and down from the engine block to the oil pan or reservoir located below the engine block and the sealing gasket member 112. For example the rubber-lined aperture 137 may be used to sealingly engage the upwardly directed oil conduit port, and rubber-lined aperture 139 is used to sealingly engage the downward flowing oil conduit port.

In the timing cover gasket member 118, shown in FIG. 11, there are also a plurality of small metal holes designated 130. These holes are used for bolts or fasteners to be placed therethrough for securing the timing cover gasket 118 (and front cover) in proper position on the front of the engine block during the assembly operation. Also shown in the gasket member 118 of FIG. 11 are two rubber-lined holes designated 133. The rubber or elastomeric material which is used to line these holes 133 is typically fashioned of the same elastomeric material used to form the seal material designated 132 in FIG. 11. These two rubber-lined holes or apertures 133, as shown in FIG. 11, are used to locate the timing cover gasket onto two locator dowels positioned in the front of the engine block for proper location purposes concerning the gasket member 118. Other types of location techniques may of course be used as will be apparent to those skilled in the art, such as threaded locator studs, other types of locator pins, and the like.

The addition of a large sealing finger 125 (see FIGS. 10 and 19–21) adjacent to the special sealing beads 24 solves two problems. The first problem solved by the sealing finger 125 is an enhancement of the durability of the T-Joint seal; and, the second problem is preventing the sealing beads 24 on the end of the oil pan gasket 112 from being oriented in only one direction during assembly of the front cover 193 to the engine.

The improvement resides in utilizing the large sealing finger 125 to assist the three (or more) sealing beads 24. The large finger 125 extends from the oil pan gasket 112 and is adjacent to the three (or more) sealing beads 24 (see FIGS. 19–21). The three sealing beads 24 press against the elastomeric pad 126 formed in the timing chain cover gasket (see FIG. 20). The large sealing finger 125 may not compress against the front cover under all conditions but it does press against the side 128a of the timing cover gasket pad 126 (see FIG. 16, and also FIGS. 19–21). By pressing the large seal finger 125 against the side of the timing cover gasket pad, the sealing capability of the T-Joint is improved. First, by preventing the sealing beads 24 from being oriented in only one direction during assembly, and secondly, by improving the durability of the leak-free T-Joint substantially.

During automotive assembly, the oil pan gasket 112 is fastened to the engine block 191. Then the oil pan 192 is fastened to the engine block 191. Next, the front cover gasket or timing cover gasket 118 is assembled to the engine block. Then the front cover or timing chain cover 193 is fastened to the engine block 191. As the front cover gasket and front cover are fastened to the engine, the sealing beads 24 which extend beyond the oil pan and engine block (FIG. 20) contact the timing cover gasket pad 126. At the same time, the large sealing finger 125, which also extends beyond the oil pan and engine block, contacts the side of the timing cover gasket pad and (depending on the tack-up tolerances of the assembly) may butt up against the front cover (see FIGS. 19–20).

Note that during the assembly of the oil pan 192 and gasket 112 to the engine block 191, the sealing beads 24 adjacent to the large finger 125 are compressed into the body of the rubber. Because rubber or elastomeric material 32 is virtually incompressible, the body of the rubber moves laterally and this causes the inner edge of the large finger to angularly compress against the side of the timing cover gasket pad 118.

The core members 28, 128 are preferably made of aluminum, but alternatively can be made of steel, plastic, magnesium, or like materials. The sealing members 32, 132 and sealing beads 24 are elastomeric and preferably made of silicone elastomer polymer, but alternatively they can be made of other rubber or elastomeric materials, such as ethylene acrylic, polyacrylate, fluorocarbon, fluorosilicone, hydrogenated nitrile, nitrile, epychlorohydrin, ethylene-propylene-diene or the like polymeric elastomer materials.

The present invention has been described in an illustrative manner, it is to be understood that the terminology which has been used is intended to be in the nature of words of description rather than limitation. Many modifications and variations of the present invention are possible in light of the above teachings.

Therefore, within the scope of the appended claims, the present invention may be practiced otherwise then as specifically described.

What is claimed is:

1. A static gasket assembly for sealing a first surface, a second surface adjacent to the first surface and a third surface intersecting the first and second surfaces, said first, second and third surfaces forming a T-joint, said T-joint being sealed absent an external sealant, said static gasket assembly comprising:
   a core member having a peripheral edge;
   a seal member adjacent to said peripheral edge, said seal member having at least one surface, at least one sealing bead on said at least one surface and an edge portion, whereby when said seal member sealingly contacts the first and second surfaces, said edge portion moves to contact the third surface; and
   a sealing finger member adjacent to said edge portion whereby said seal member and sail sealing finger seal the T-joint absent the use of an external sealant.

2. A static gasket as claimed in claim 1 wherein said sealing finger is adjacent to at least one sealing bead, and said seal member and said sealing finger member are made of an elastomeric material.

3. A static gasket as claimed in claim 2 wherein said core member further has a longitudinal portion and a lateral portion and wherein said sealing finger has a tip, said tip having an inner edge.

4. A static gasket as claimed in claim 3 wherein the third surface has a gasket pad and whereby said edge portion moves longitudinally of said core member and said at least one sealing bead moves laterally of said core member, and said inner edge of said tip of said sealing finger is compressed against said gasket pad.

5. A static gasket as claimed in claim 4 wherein said edge portion has at least one edge bead.

6. A static gasket as claimed in claim 5 wherein said at least one edge bead is three beads, and each of said three beads has a different length than the other.

7. A static gasket as claimed in claim 6 wherein the first of said three beads is longer than the second of said three beads and the second of said three beads is longer than the third of said three beads.

8. A static gasket in claim 2 wherein said edge portion is connected to said sealing finger.

9. A static gasket as claimed in claim 2 wherein said elastomeric material is selected from the group consisting of silicone, ethylene acrylic, polyacrylate, fluorocarbon, fluorosilicone, hydrogenated nitrile, nitrile, epychlorohydrin and ethylene propylene diene.

10. A static gasket for sealing a first planar surface, a second planar surface in spaced relation to said first planar surface, and a third planar surface intersecting the planes of the first and second planar surfaces, a static seal surface on said third planar surface, said first, second and third planar surfaces form a T-joint, said static gasket comprising:
    a core member having an external edge;
    a seal member adjacent to said external edge, said seal member having at least one seal bead and edge portion adjacent to said at least one seal bead, whereby when said at least one seal bead sealingly engages the first and second planar surfaces, said edge portion moves in a direction away from said external edge to contact the static seal surface on the third planar surface; and
    a sealing finger adjacent to said edge portion, said sealing finger contacting the static seal surface on the third planar surface to seal the T-joint.

11. A static gasket as claimed in claim 10 wherein said sealing finger contacts the side of the static seal surface on the third planar surface.

12. A static gasket as claimed in claim 11 wherein said sealing finger has an inner edge adjacent to the edge portion and an external edge, and wherein said core member has a lateral portion and a longitudinal portion, said seal member has a laterally extending portion and longitudinally extending portion, said longitudinally extending portion moves said edge portion to sealingly engage the static seal on the third planar surface, and wherein said sealing finger is adjacent to said laterally extending portion of said seal member.

13. A static gasket as claimed in claim 12 wherein said sealing finger has an inner edge, said inner edge contacting the static seal on the third planar surface, and wherein said inner edge sealingly engages the static seal, and wherein said at least one seal bead is a pair of adjacent sealing beads, and wherein said pair of adjacent sealing beads are connected by a plurality of dams, and wherein said at least one seal bead is a first sealing bead on one side and a second sealing bead on the opposite side.

14. A T-joint gasket assembly for sealing a first surface, a second surface adjacent to the first surface, and a third surface intersecting the first and second surfaces, said first, second and third surfaces generally forming a T-joint, said T-joint being sealed absent an external sealant, said gasket assembly comprising:
    a first gasket member which has at the ends thereof a plurality of sealing beads and at least one sealing finger,
    a second gasket member positioned generally coextensive with said third surface, and being oriented so as to provide a T-joint like connection with said first gasket member, with both the first gasket member and the second gasket member including a supportable elastomeric sealing material to carry out the gasket sealing, said second gasket member possessing a plurality of elastomeric sealing pads thereon, said sealing beads and said sealing finger of the first gasket member being provided to make sealing contact with said sealing pads on said second gasket member to form a sealed T-joint.

15. The gasket assembly of claim 14 wherein, said first gasket member is generally U-shaped.

16. The gasket assembly of claim 15 wherein, a plurality of apertures are located in the sealing material generally adjacent each of said sealing pads to enable said sealing pads, said sealing beads and said sealing finger to be deformed in an appropriate direction when forming the sealed T-joint.

17. The gasket assembly of claim 16 wherein, said sealing material includes dual sealing ridges along a major portion of its periphery.

18. The gasket assembly of claim 16 wherein, both said first and second gasket members include a core member made of metal, which core member supports the elastomeric sealing material.

19. The gasket assembly of claim 18 wherein, each said core member includes a plurality of holes for property aligning each gasket member on to a surface to be sealed.

20. The gasket assembly of claim 19 wherein, said first surface is on a lower part of an engine block, said second surface is on an oil pan associated with the engine block, and said third surface is associated with a front cover on the engine block.

21. The gasket assembly of claim 14 wherein, a plurality of apertures are located in the sealing material generally adjacent each of said sealing pads to enable said sealing pads, said sealing beads and said sealing finger to be deformed in an appropriate direction when forming the sealed T-joint.

22. The gasket assembly of claim 21 wherein, said sealing beads have a height of about 0.25 to about 5 millimeters.

23. The gasket assembly of claim 14 wherein, said first surface is on a lower part of an engine block, said second surface is on an oil pan associated with the engine block, and said third surface is associated with a front cover on the engine block.

24. A T-joint gasket assembly for sealing a first surface, a second surface adjacent to the first surface, and a third surface intersecting the first and second surfaces, said first, second and third surfaces generally forming a T-joint, said T-joint being sealed absent an external sealant, said gasket assembly comprising:

a first gasket member which has at the ends thereof a plurality of sealing beads;

a second gasket member positioned generally coextensive with said third surface, and being oriented so as to provide a T-joint like connection with said first gasket member, with both the first gasket member and the second gasket member including a supportable elastomeric sealing material to carry out the gasket sealing, said second gasket member possessing a plurality of elastomeric sealing pads thereon, said sealing beads of the first gasket member being provided to make sealing contact with said sealing pads on said second gasket member to form a sealed T-joint.

25. The gasket assembly of claim 24 wherein, said first gasket member is generally U-shaped.

26. The gasket assembly of claim 25 wherein, a plurality of apertures are located in the sealing material generally adjacent each of said sealing pads to enable said sealing pads and said sealing beads to be deformed in an appropriate direction when forming the sealed T-joint.

27. The gasket assembly of claim 26 wherein, both said first and second gasket members include a core member made of metal, which core member supports the elastomeric sealing material.

28. The gasket assembly of claim 27 wherein, each said core member includes a plurality of holes for properly aligning each gasket member on to a surface to be sealed.

29. The gasket assembly of claim 28 wherein, said first surface is on a lower part of an engine block, said second surface is on an oil pan associated with the engine block, and said third surface is associated with a front cover on the engine block.

30. The gasket assembly of claim 24 wherein, a plurality of apertures are located in the sealing material generally adjacent each of said sealing pads to enable said sealing pads, and said sealing beads to be deformed in an appropriate direction when forming the sealed T-joint.

31. The gasket assembly of claim 30 wherein, said sealing beads have a height of about 0.25 to about 5 millimeters.

32. The gasket assembly of claim 31 wherein, both said first and second gasket members include a core member made of metal, which core member supports the elastomeric sealing material.

33. The gasket assembly of claim 32 wherein, each said core member includes a plurality of holes for properly aligning each gasket member on to a surface to be sealed.

34. The gasket assembly of claim 33 wherein, said first surface is on a lower part of an engine block, said second surface is on an oil pan associated with the engine block, and said third surface is associated with a front cover on the engine block.

35. The gasket assembly of claim 24 wherein, said first surface is on a lower part of an engine block, said second surface is on an oil pan associated with the engine block, and said third surface is associated with a front cover on the engine block.

\* \* \* \* \*

UNITED STATES PATENT AND TRADEMARK OFFICE
CERTIFICATE OF CORRECTION

PATENT NO. : 6,173,966 B1
DATED : January 16, 2001
INVENTOR(S) : Noble et al.

It is certified that error appears in the above-identified patent and that said Letters Patent is hereby corrected as shown below:

<u>Column 3,</u>
Line 2, please delete "scaling" and insert -- sealing --

<u>Column 4,</u>
Line 5, please delete "scaling" and insert -- sealing --

Signed and Sealed this

Twenty-fifth Day of March, 2003

JAMES E. ROGAN
*Director of the United States Patent and Trademark Office*